United States Patent

Rayburn

[15] 3,645,028
[45] Feb. 29, 1972

[54] FISHING POLE HOLDER AND SIGNALING MEANS THEREFOR

[72] Inventor: Donald G. Rayburn, 427 North Reese Pl., Burbank, Calif. 91506

[22] Filed: June 22, 1970

[21] Appl. No.: 48,133

[52] U.S. Cl. .................................. 43/17, 43/21.2, 248/413
[51] Int. Cl. .................................. A01k 97/10, A01k 97/12
[58] Field of Search .................... 43/17, 21.2; 248/161, 411, 248/413

[56] References Cited

UNITED STATES PATENTS

| | | | |
|---|---|---|---|
| 2,917,858 | 12/1959 | Ikeuchi | 43/17 |
| 2,909,860 | 10/1959 | Braun | 43/17 |
| 3,285,360 | 11/1966 | Wetsch | 43/17 |
| 3,359,672 | 12/1967 | Schwartz et al. | 43/17 |
| 2,160,499 | 5/1939 | Goeb | 248/44 |
| 2,612,695 | 10/1952 | Schneider et al. | 248/413 X |
| 3,010,239 | 11/1961 | Johnson | 43/17 |

Primary Examiner—Samuel Koren
Assistant Examiner—Daniel J. Leach
Attorney—Harris, Kiech, Russell & Kern

[57] ABSTRACT

An adjustable fishing pole holder having means for signaling a strike. The holder includes an elongated support element for insertion into the ground, a signaling means mounted at the top end of the support element, a carriage slidably mounted on the support element, a first support means carried by the carriage for supporting the lower end of a fishing pole, a second support means pivotally mounted on the holder for supporting the fishing pole above its lower end, the second support means being in contact with the signaling means for actuation thereof, and means for tension-biasing the direction of the pivotal movement of the second support means.

8 Claims, 9 Drawing Figures

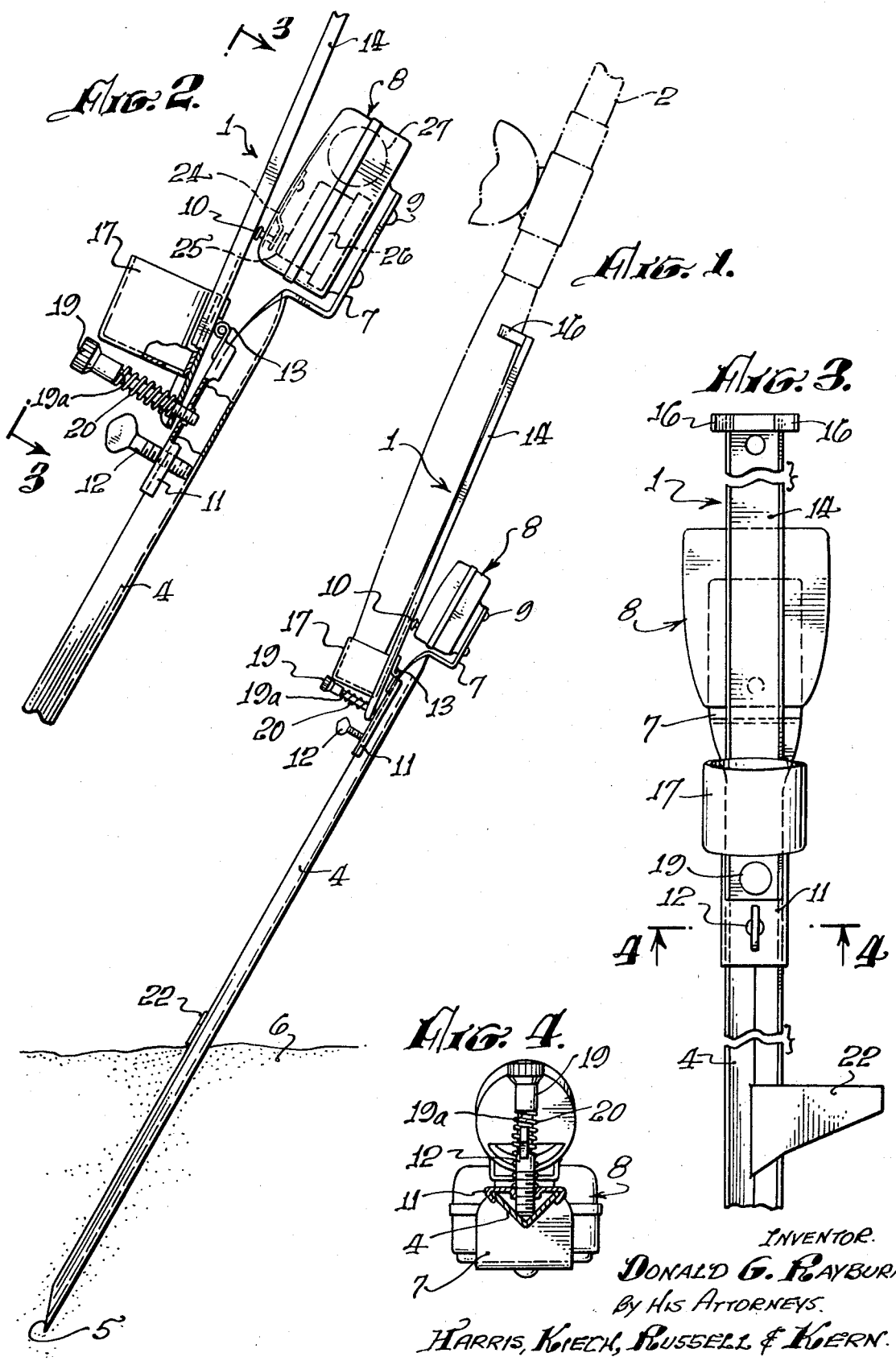

Patented Feb. 29, 1972 3,645,028
2 Sheets-Sheet 2
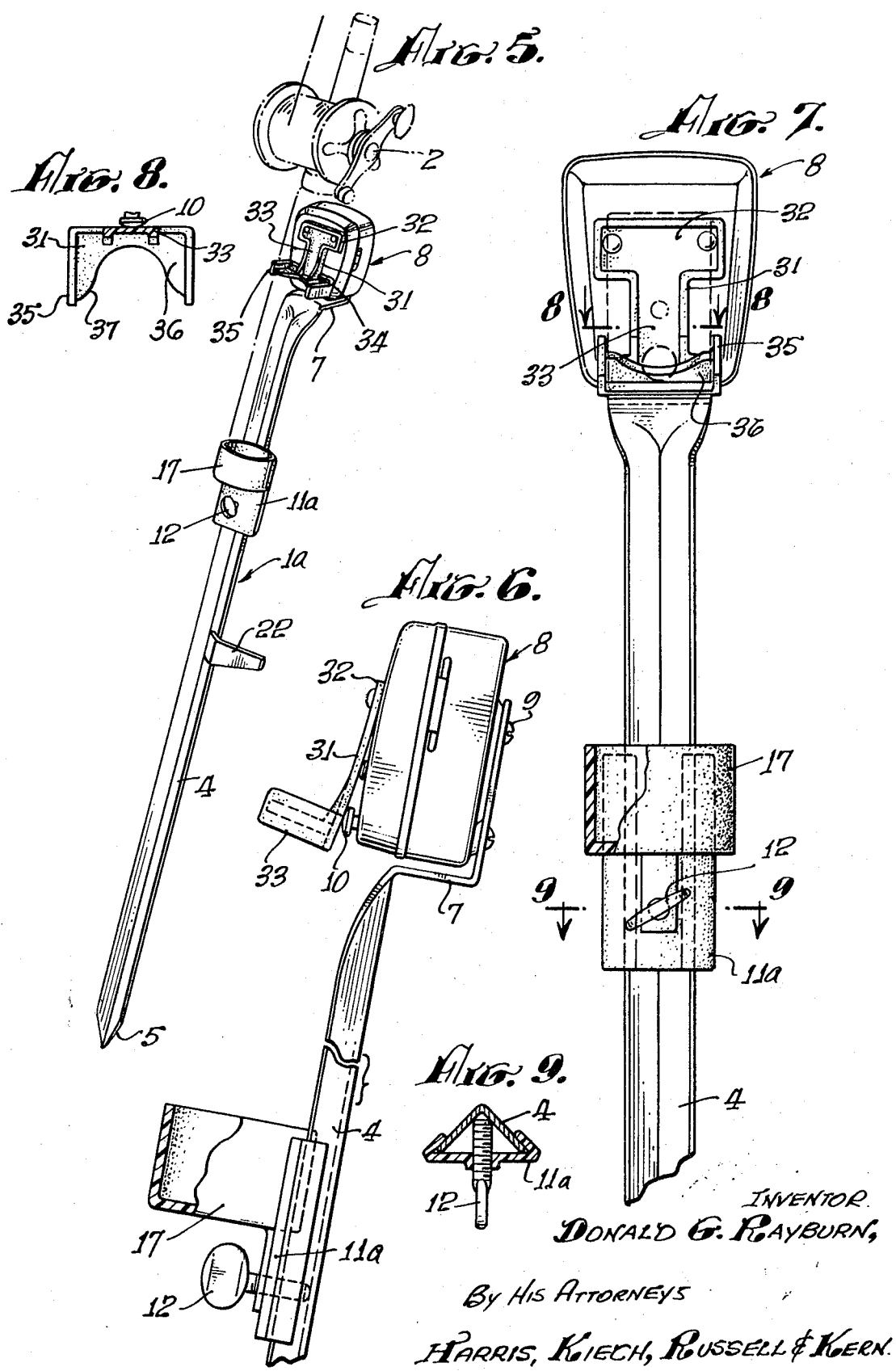

FISHING POLE HOLDER AND SIGNALING MEANS THEREFOR

BACKGROUND OF THE INVENTION

The present invention is directed to holders for fishing poles. More particularly, the present invention is directed to a fishing pole holder which has means for signaling a strike by a fish. Fishing pole holders have been used since the time man began to fish with a pole and line. The oldest and simplest holder is a wooden stick or limb which can be inserted into the ground and to which a fishing pole can be tethered with rope, thongs, and the like or clamped with clamping devices. Another ancient holder is a Y-shaped limb. This holder is relatively simple to use; the leg of the holder is inserted into the ground and the pole is laid across the yoke of the limb with the pole's end resting on the ground, optionally supported by a stone boulder. More recently, tubes and pipes have been used as holders. One end of the tube is inserted in the ground and the end of the pole is placed in the open top end of the tube. Although the above holders have been used for many years with varying degrees of success, they are not entirely satisfactory. When the pole is tethered or clamped to a stick or rod, the fisherman cannot readily grasp and remove the pole from the holder when a strike has been made. In such cases, the fisherman must first free the pole from the holder before he can play and reel in the fish. Frequently, when the fisherman cannot play or reel in the fish immediately after the strike, he will lose his fish and line; sometimes he will even lose his pole through breakage.

When employing conventional fishing pole holders, the fisherman is usually not made aware of a strike until he hears the spinning or singing of the fishing reel as the line is being rapidly drawn out. Although a fisherman could undoubtedly tie a piece of line between his pole and himself in order to provide a means of signaling a strike, such means are highly inconvenient and very impracticable under many fishing conditions, such as surf fishing conditions.

A further disadvantage of the conventional fishing pole holders is that they are not telescopically adjustable. In areas where the ground or sand is soft, much of the rod or stick must be inserted into the ground to provide effective support for the rod leaving only a small stub above ground to support the rod. In other areas where the ground is relatively hard, the holder can be inserted only a short distance into the ground or sand leaving a fairly long portion of the support projecting out of the ground. This long exposed portion often gets in the way of the fishing rod and/or becomes entangled in the fishing line, and/or projects the pole unnecessarily higher into the air.

BRIEF SUMMARY OF THE INVENTION

The present invention is directed to an adjustable fishing pole holder having means for signaling a strike and comprises in combination an elongated support member, a carriage slidably carried on the support member, means for locking the carriage at predetermined positions along the length of the support member, an elongated strut pivotally connected to the carriage by pivot means, means on the strut for removably attaching a fishing pole thereto, a signaling element attached to the top end of the support member, the signaling element having a signal-actuating means adjacent the strut for actuation of the signaling element when the strut is pivoted in a first direction, and a tension means for biasing the strut in a direction opposite the first direction. In an alternative embodiment of the present invention, the strut and tension means are omitted, the receiver element is mounted on the carriage, the receiver element is adapted to support the lower end of a fishing pole, and a bendable retaining element is mounted on the holder adjacent the signal-actuating means, the retaining element is bendable in the first direction to actuate the signaling means and is adapted to support a fishing pole above its lower end.

It is an object of the present invention to provide a fishing pole holder which has means for signaling a strike.

Another object of the present invention is to provide a fishing pole holder that can be used equally well in soft or hard ground. More particularly, it is an object to provide a holder that can be telescopically adjusted to control the height of the pole above the ground. A further object of the present invention is to provide a fishing pole holder which can be used to support all styles and sizes of fishing poles. More particularly, it is an object to provide a holder that securely supports a pole but permits rapid removal of the pole when a strike has been made.

Another and further object of the present invention is to provide a fishing pole holder that is light in weight, sturdy in construction and easy to maintain. More particularly, it is an object to provide a holder that is of relatively simple construction and made from a minimum number of parts.

DESCRIPTION OF THE DRAWINGS

FIG. 1 is a side view of the fishing pole holder of the present invention supporting a fishing pole;

FIG. 2 is an enlarged side sectional view of the fishing pole holder;

FIG. 3 is an enlarged top view of the fishing pole holder taken along the line 3—3 of FIG. 2;

FIG. 4 is an enlarged sectional view of the fishing pole holder taken along line 4—4 of FIG. 3;

FIG. 5 is a perspective view of an alternative embodiment of a fishing pole holder of the present invention;

FIG. 6 is an enlarged fragmentary side view of the fishing pole holder of FIG. 5;

FIG. 7 is an enlarged fragmentary top view of the fishing pole holder of FIG. 5;

FIG. 8 is an enlarged sectional view of the fishing pole holder taken along line 8—8 of FIG. 7; and FIG. 9 is an enlarged sectional view of the fishing pole holder taken along line 9—9 of FIG. 7.

DESCRIPTION OF THE PREFERRED EMBODIMENT OF THE PRESENT INVENTION

Referring to FIG. 1, fishing pole holder 1 of the present invention is supporting a fishing pole 2 as illustrated. The holder 1 of the present invention comprises in combination an elongated channeled member 4 having a beveled bayonet point 5 at its bottom end, which is inserted into the sand 6, and a downwardly offset platform 7 at its upper end. An electrically powered sound generator 8 is secured on its back side to the platform 7 by retainer screws 9. The sound generator 8 has a spring-biased switch button 10 projecting from the front thereof. Slidably mounted on the channel member 4 is a carriage 11 having a threaded thumb screw 12 which threadably engages the carriage 11 and extends therethrough. The carriage 11 has a hinge element 13 mounted on its forward end. The hinge element 13 is secured to the underside of an elongated strut 14 near its bottom end for pivotal or hinged movement of the latter. The strut 14 is a channeled member having upwardly projecting sides. Upwardly projecting fingers 16 are mounted on the sides of the strut 14 at its top end. Near the bottom end of the strut 14 there is mounted a cup or receiver 17 having a closed end and sides; the receiver 17 is mounted on the upper surface of the strut 14 with its open end facing the top end of the strut. A threaded adjustment screw 19 passes through a hole in the bottom end of the strut 14 and threadably engages the carriage 11. A compression spring 20 is mounted about the adjustment screw 19, and its ends engage the bottom end of the strut 14 and an upper shoulder portion 19a of the adjustment screw 19 (this is best seen in FIG. 2). The bottom side of the strut 14, forward of the hinge element 13, rests on and is in contact with the switch button 10.

Referring to FIG. 2, the sound generator 8 is shown to consist of a spring-biased switch contact 24 which is connected to switch button 10, a switch contact 25 which is mounted opposite switch contact 24, a sound-generating device 26, such as a solenoid-actuated vibrating diaphragm-type sound generator, a solenoid-actuated bell-type sound generator or a solenoid-operated vibrating strip buzzer-type sound generator, and an electrical power source 27, such as a dry cell battery. The switch contact 24 is connected to one pole of the electrical source 27. The other pole of the electrical source 27 is connected to one side of the sound-generating device 26. The other side of the device 26 is connected to the switch contact 25. When the switch button 10 is depressed causing switch contact 24 to make contact with switch contact 25, the electrical circuit of the sound generator 8 is completed causing actuation of the sound generator.

The strut 14 is hinged just forward of its bottom end, and the bottom end is biased toward the carriage by means of thread adjustment screw 19 and compression spring 20. The end of a fishing pole 2 is inserted into a receiver 17; when there is a strike on the line connected to the pole, the pole is forced downward acting as a lever in line with strut 14 which causes switch button 10 to be depressed and thus actuates the sound generator as described above.

Referring to FIG. 3, the channel member 4 includes a step member 22 which is secured to the channel member 4 between its ends (see FIG. 1) and extends laterally therefrom.

Referring to FIG. 4, the channel member 4 is an L-shaped angle member having outwardly projecting sides. The carriage 11 is a channeled member having inwardly projecting sides which extend over and around the sides of the channel member 4 in slidable relationship. The threaded thumbscrew 12 is threadably engaged with the carriage 11 and extends therethrough to the inner side of the back portion of the channel member 4. When the thumbscrew 12 is screwed down tightly, the carriage 11 is locked in position with respect to the channel member 4.

OPERATION OF THE FISHING POLE HOLDER

Preferably, the position of the carriage 11 is first adjusted with respect to the channel member 4 and secured by tightening thumbscrew 12. The pivot tension of the strut is adjusted by rotating the adjustment screw 19 in the appropriate direction. The holder is then inserted into the ground at any desired angle by stepping on the step member 22. The fisherman then casts his line into the water and places the end of the fishing pole 2 into the receiver 17; the upper end of the handle portion of the fishing pole 2 is retained in place by the projecting fingers 16. If the water is rough and/or the wind is brisk, the line may exert more force upon the pole than anticipated, causing the top end of the strut 14 to pivot to the right and downward, actuating the sound generator 8. In such cases, the pivot tension of the strut 14 can be increased by screwing the threaded screw 19 downwardly into the carriage 11. When a fish makes a bite or strike on the line, a pressure will be exerted on the line causing the top of the pole 2 and the strut 14 to pivot to the right and downward thereby depressing the switch button 10 and actuating the sound generator 8 as described above. When the fisherman hears the signal, he can promptly lift the rod out of the holder and play the fish or reel it in.

FIG. 5 illustrates an alternative embodiment of the present fishing pole holder, with elements corresponding to those of FIGS. 1–4 identified by the same reference numerals. The fishing pole holder 1a, supporting a fishing pole 2 as illustrated, comprises in combination the elongated channel member 4 having a beveled bayonet point 5 at its bottom end and a downwardly offset platform 7 at its upper end to which is secured the electrically powered sound generator 8. The channel member 4 includes a step member 22 which is secured to the channel member between its ends and extends laterally therefrom. Slidably mounted on the channel member 4 is a carriage 11a having the threaded thumb screw 12 which threadably engages the carriage 11a and extends therethrough to make contact with the channel member 4. On the upper portion of the carriage 11a there is mounted a receiver 17 having a closed end and sides; the open end of the receiver 17 faces toward the top end of the channel member 4. A bendable I-shaped retaining element 31 is mounted on the cover of the sound generator 8. The retaining element 31 has a horizontal upper portion 32 which is secured to the cover of the generator 8, a flexible shank portion 33 which connects the upper portion 32 to a horizontal base portion 34. Finger portions 35 project upwardly from the sides of the base portion 34.

Referring to FIG. 6, the retaining element 31 is shown to be mounted on the forward portion of the top of the generator 8 with the base portion 34 of the retaining element 31 adjacent the spring-biased switch button 10 of the generator 8.

As shown in FIG. 7, the retainer element 31 has a web portion 36 extending upward from the base portion 34 and inward from the fingers 35. The web portion 36 has a concaved curved periphery 37 (see FIG. 8) which is adapted to fit a broad range of fishing pole handles of different diameters.

Referring to FIG. 9, the channel member 4 is an L- or V-shaped angle member having outwardly projecting sides. The carriage 11a is a channel member having inwardly projecting sides which extend over and around the sides of the channel member 4 in slidable relationship. The threaded thumbscrew 12 is threadably engaged with the carriage 11 and extends therethrough to the inner side of the back portion of the channel member 4. The carriage 11a is locked in position with respect to the channel member 4 by tightening the thumb screw 12 against the channel member.

OPERATION OF THE FISHING POLE HOLDER

The position of the carriage 11a is first adjusted with respect to the channel member 4 and secured by tightening the thumb screw 12. The holder is then inserted into the ground at any desired angle and entrenched securely in the ground by stepping on member 22. After the fisherman has cast his line into the water, the end of the fishing pole 2 is placed into receiver 17 and the upper end of the handle portion of the fishing pole is inserted into the web portion 36, between the fingers 35, of the retaining element 31. The signaling sensitivity of the holder is adjusted by moving the carriage 11a up or down; upward for increased sensitivity and downward for decreased sensitivity. When a fish makes a strike on the line, the pressure on the line will cause the pole to pivot downward, the receiver 17 acting as a fulcrum point, bending the retaining element downward, and moving the base portion 34 and the button 10 downward to actuate the sound generator 8 as described above. When the fisherman hears the signal, he can readily lift the rod out of the holder without cause for delay.

Although the invention described has employed certain embodiments, appropriate substitutions can be made in the present invention without departing from the inventive embodiment thereof, For example, other types of signaling devices can be employed in the present invention, such as a light-type signaling device, or a combination light and sound signaling device. Further, the elongated support channel member 4 can be a U-shaped channel or a box-shaped channel having an upper slit running its length, and the carriage 11 can be a rectangular member, optionally slit in the back, which is slidably mounted around the channel member 4. Furthermore, the hinge 13 can be substituted with a U-shaped or S-shaped spring member.

I claim:

1. An adjustable fishing pole holder with means for signaling a strike, comprising in combination:
   an elongated channeled member having outwardly projecting sides;
   an electrically powered sound generator attached to the upper end of said channeled member, said sound generator having a spring-biased switch button projecting upward therefrom, said sound generator being actuated when said switch is depressed downward theretowards;

a channeled carriage member carried by said channeled member and slidable along the length thereof, said carriage member having inwardly projecting sides that extend over and around the sides of said channeled member;

an elongated channeled strut with upwardly projecting sides pivotally connected on its bottom side and near its back end to the carriage member by pivot means, said strut having upwardly projecting fingers mounted on its sides at its forward end, said strut having a receiver with a closed end and sides mounted on its upper side near its back end with the open end of said receiver facing toward the forward end, the bottom side of said strut forward of the pivot means being in contact with said switch button;

locking means for locking said carriage member at a predetermined position along the length of said channeled member; and tension adjustment means for biasing the bottom end of said strut toward said carriage member.

2. The fishing pole holder as defined in claim 1 wherein the bottom end of said channeled member has a beveled bayonet point and the top end of said channeled member has a downwardly offset platform to which is attached said sound generator, and said channeled member includes a step member mounted thereon between its ends and projecting laterally therefrom.

3. The fishing pole holder as defined in claim 1 including a threaded element projecting through a hole in the back end of said strut behind said pivot means and threadably engaging said carriage member, said threaded element having an upper shoulder portion; and a compression spring mounted around said threaded element with its ends engaged between the upper side of said strut and said shoulder portion.

4. The fishing pole holder as defined in claim 1 including a threaded element threadably engaged with said carriage and extending therethrough for contact with said support element providing means for locking said carriage in a predetermined position along the length of said support element.

5. An adjustable fishing pole holder with means for signaling a strike, comprising in combination:

an elongated channel member having outwardly projecting sides;

an electrically powered sound generator attached to the upper end of said channel member, said sound generator having a spring biased switch button projecting upward through the top thereof, said sound generator being actuated when said switch is depressed downwardly theretoward;

a flexible retainer element having a first end portion which is secured to the top of said generator, a flexible middle portion which connects said first end portion with a second end portion, said second end portion having finger portions projecting upwardly from the side thereof for supporting a fishing pole therebetween, said retainer element being adjacent to said switch button and bendable downwardly thereon;

a channeled carriage member carried by said channel member and slidable along the length thereof, said carriage member having inwardly projecting sides that extend over and around the sides of said channel member;

a receiver element having a closed end and sides mounted on said carriage member, the open end of said receiver facing upward toward said retainer element, said receiver element adapted to support the lower end of a fishing pole; and locking means for locking said carriage member at a predetermined position along the length of said channel member.

6. The fishing pole holder as defined in claim 5 wherein the bottom end of said channel member has a beveled bayonet point and the top of said channel member has a downwardly offset platform to which is attached said sound generator, said channel member including a step member mounted thereof between its ends and projecting laterally therefrom.

7. The fishing pole holder as defined in claim 5 wherein said carriage member including a threaded element threadably engaged with said carriage and extending therethrough for contact with said support element providing locking means for locking said carriage in a predetermined position along the length of said support element.

8. An adjustable, fishing pole holder having means for signaling a strike, comprising in combination:

an elongated support member;

a carriage carried on said support member and slidable therealong;

retaining means for retaining said carriage and support member in a sliding relationship;

locking means for locking said carriage in a predetermined position along the length of said support member;

a signaling element attached to the upper end of said support member for signaling a bite, said signaling element having signal-actuating means;

a receiver element having a closed end and sides mounted on said carriage for supporting the end of a fishing pole, the open end of said receiver element facing toward the top end of said support member; and a flexible l-shaped retaining element having its upper horizontal portion attached to said signaling element, a flexible vertical shank portion which connects said upper portion to a lower horizontal portion, said lower portion having walls projecting upwardly from its sides for supporting a fishing pole therebetween, said shank portion being bendable in a first direction toward said support member, said retaining element being adjacent said signal-actuating means and actuating said actuating means when said shank portion is bent in said first direction.

* * * * *